(12) United States Patent
Kawamata et al.

(10) Patent No.: US 12,257,817 B2
(45) Date of Patent: Mar. 25, 2025

(54) COMPOSITE PANEL STRUCTURE AND METHOD OF MANUFACTURING

(71) Applicant: Kawasaki Jukogyo Kabushiki Kaisha, Kobe (JP)

(72) Inventors: Akio Kawamata, Kobe (JP); Yoichi Nakamura, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 115 days.

(21) Appl. No.: 17/599,581

(22) PCT Filed: Mar. 30, 2020

(86) PCT No.: PCT/JP2020/014554
§ 371 (c)(1),
(2) Date: Sep. 29, 2021

(87) PCT Pub. No.: WO2020/203971
PCT Pub. Date: Oct. 8, 2020

(65) Prior Publication Data
US 2022/0161914 A1    May 26, 2022

(30) Foreign Application Priority Data
Mar. 29, 2019    (JP) ................. 2019-067121

(51) Int. Cl.
*B29C 70/46*    (2006.01)
*B32B 5/02*    (2006.01)
(Continued)

(52) U.S. Cl.
CPC .............. *B32B 5/02* (2013.01); *B32B 5/26* (2013.01); *B32B 15/02* (2013.01); *B32B 15/20* (2013.01); *B64C 1/06* (2013.01); *B29C 70/46* (2013.01); *B29K 2101/12* (2013.01); *B29K 2105/089* (2013.01); *B29K 2307/04* (2013.01); *B29L 2031/3076* (2013.01); *B32B 2260/023* (2013.01); *B32B 2260/046* (2013.01); *B32B 2605/18* (2013.01); *B64C 2001/0072* (2013.01); *B64U 20/65* (2023.01)

(58) Field of Classification Search
CPC ....................................................... B29C 70/46
See application file for complete search history.

(56) References Cited

U.S. PATENT DOCUMENTS 4,051,290 A *  9/1977  Jutte ................. B29D 99/0014
                                                                428/209
5,200,251 A    4/1993  Brand
(Continued)

FOREIGN PATENT DOCUMENTS

WO    2008/038429 A1    4/2008
WO    2016/159118 A1    10/2016
WO    2018/142963 A1    8/2018

*Primary Examiner* — Andrew D Graham
(74) *Attorney, Agent, or Firm* — XSENSUS LLP

(57) ABSTRACT

A panel structure (10A) includes a substrate portion (11) and at least two ribs (12) standing on the substrate portion (11) and intersecting with each other. A substrate material portion (24) constituting the substrate portion (11) is formed by using at least matrix resin. Continuous fibers or slit continuous fibers are arranged at a position corresponding to the ribs (12) and a rib intersecting portion (13).

9 Claims, 7 Drawing Sheets

(51) Int. Cl.
  *B32B 5/26* (2006.01)
  *B32B 15/02* (2006.01)
  *B32B 15/20* (2006.01)
  *B64C 1/06* (2006.01)
  *B29K 101/12* (2006.01)
  *B29K 105/08* (2006.01)
  *B29K 307/04* (2006.01)
  *B29L 31/30* (2006.01)
  *B64C 1/00* (2006.01)
  *B64U 20/65* (2023.01)

(56) References Cited

U.S. PATENT DOCUMENTS

| | | | | |
|---|---|---|---|---|
| 5,919,543 | A * | 7/1999 | McCarville | B64C 1/065 |
| | | | | 264/258 |
| 6,217,000 | B1 * | 4/2001 | Younie | B29D 99/0003 |
| | | | | 264/258 |
| 6,821,613 | B1 * | 11/2004 | Kagi | B29C 70/86 |
| | | | | 428/297.4 |
| 8,163,122 | B1 * | 4/2012 | Paul | D04H 3/12 |
| | | | | 428/102 |
| 9,463,864 | B1 * | 10/2016 | McCarville | B64C 1/00 |
| 10,232,532 | B1 * | 3/2019 | Prebil | B29C 66/721 |
| 2001/0040317 | A1 * | 11/2001 | Shiraishi | B29C 43/18 |
| | | | | 156/247 |
| 2006/0165955 | A1 * | 7/2006 | Ruegg | B60N 2/686 |
| | | | | 428/113 |
| 2010/0028593 | A1 * | 2/2010 | Taketa | B32B 5/26 |
| | | | | 428/113 |
| 2010/0028616 | A1 | 2/2010 | Yamanouchi et al. | |
| 2012/0063050 | A1 * | 3/2012 | Langone | B29C 70/386 |
| | | | | 156/60 |
| 2013/0105072 | A1 * | 5/2013 | Anderson | B32B 38/0004 |
| | | | | 156/264 |
| 2013/0337207 | A1 * | 12/2013 | Mueller | B29C 70/205 |
| | | | | 156/196 |
| 2014/0339036 | A1 * | 11/2014 | Arai | B29C 70/12 |
| | | | | 188/371 |
| 2014/0343191 | A1 * | 11/2014 | Sekine | B32B 5/26 |
| | | | | 523/400 |
| 2015/0030803 | A1 * | 1/2015 | Butler | B32B 5/022 |
| | | | | 264/258 |
| 2015/0125655 | A1 * | 5/2015 | Kajita | B32B 38/0012 |
| | | | | 156/196 |
| 2015/0183139 | A1 * | 7/2015 | Takano | B29C 70/46 |
| | | | | 264/219 |
| 2015/0217508 | A1 * | 8/2015 | Rossi | B29C 33/448 |
| | | | | 428/80 |
| 2016/0016382 | A1 * | 1/2016 | Ishikawa | B29B 15/08 |
| | | | | 156/324 |
| 2016/0121554 | A1 * | 5/2016 | Inoh | B29C 65/4815 |
| | | | | 264/257 |
| 2016/0167314 | A1 * | 6/2016 | Ingram | B29C 43/36 |
| | | | | 264/325 |
| 2016/0194468 | A1 * | 7/2016 | Ogasawara | B29B 15/08 |
| | | | | 524/495 |
| 2017/0157889 | A1 * | 6/2017 | Ishikawa | B29C 70/46 |
| 2017/0326820 | A1 * | 11/2017 | Fujioka | B29C 45/14 |
| 2017/0349288 | A1 * | 12/2017 | Fette | B29C 70/865 |
| 2018/0104869 | A1 * | 4/2018 | Maeda | B29C 70/46 |
| 2018/0272645 | A1 * | 9/2018 | Pavlov | B29C 70/22 |
| 2019/0077048 | A1 * | 3/2019 | Fujita | B29C 70/20 |
| 2019/0210303 | A1 * | 7/2019 | Jones | B32B 5/022 |
| 2019/0358914 | A1 * | 11/2019 | Boyer | B32B 5/024 |
| 2020/0001550 | A1 * | 1/2020 | Fujita | B29C 70/34 |
| 2020/0024414 | A1 * | 1/2020 | Ichino | B29C 70/22 |
| 2020/0247071 | A1 * | 8/2020 | Adachi | B29C 70/202 |
| 2020/0369843 | A1 * | 11/2020 | Ootsubo | C08L 101/00 |
| 2021/0115209 | A1 * | 4/2021 | Furuhashi | B32B 5/12 |
| 2021/0229377 | A1 * | 7/2021 | Shimada | B29C 70/46 |
| 2022/0161914 | A1 * | 5/2022 | Kawamata | B29C 70/345 |

* cited by examiner

COMPOSITE PANEL STRUCTURE AND METHOD OF MANUFACTURING

Cross-Reference to Related Application

The present application claims priority to PCT/JP2020/014554 filed Mar. 30, 2020, and JP 2019-067121 filed Mar. 29, 2019, both of which are incorporated herein by reference.

TECHNICAL FIELD

The present invention relates to a composite panel structure manufactured by press-forming and a method of manufacturing the composite panel structure, and particularly to a composite panel structure reinforced by a rib standing on a substrate portion and a method of manufacturing the composite panel structure.

BACKGROUND ART

Typically, composite structure of aircrafts are manufactured by using autoclave molding in many cases. However, since a molding time of the autoclave molding is long, the autoclave molding is generally regarded as unsuitable for mass production. Therefore, as a method of realizing the mass production, a method of manufacturing composite structure, which are not limited to aircraft parts, by press-forming has been considered.

For example, PTL 1 discloses a forming method of: preparing sheet base materials each including one or more slit prepreg; arranging the sheet base materials to form an overlapping portion where the sheet base materials overlap each other and a non-overlapping portion where the sheet base materials do not overlap each other; and subjecting the sheet base materials to heating and pressurizing. With this, according to PTL 1, fiber reinforced plastic which has an excellent complex structure and achieves a high mechanical characteristic can be manufactured with high productivity.

CITATION LIST

Patent Literature

PTL 1: International Publication No. 2018/142963

Especially, according to the manufacturing method disclosed in PTL 1, the sheet base materials are made to overlap each other and are subjected to press-forming, and with this, the sheet base materials are stretched to form the rib. However, according to this manufacturing method, reinforced fibers are not arranged at an intersecting portion where the ribs intersect with each other, and only matrix resin is practically arranged at the intersecting portion. Therefore, the strength of the intersecting portion depends on the matrix resin constituting the intersecting portion, and therefore, the intersecting portion cannot obtain adequate strength.

Summary

A composite panel structure according to the present disclosure is a composite panel structure that is a press-formed product made of a composite material containing reinforced fibers and matrix resin, the composite panel structure including: a substrate portion; and at least two ribs standing on the substrate portion and intersecting with each other. As the reinforced fibers, continuous fibers or slit continuous fibers are arranged at the ribs and a rib intersecting portion where the ribs intersect with each other.

A method of manufacturing a composite panel structure according to the present disclosure is a method of manufacturing a composite panel structure, the composite panel structure including a substrate portion and at least two ribs standing on the substrate portion and intersecting with each other, the composite panel structure being made of a composite material containing reinforced fibers and matrix resin, the method including: forming a substrate material portion by using at least the matrix resin, the substrate material portion constituting the substrate portion; laminating rib prepregs on the substrate material portion at a position corresponding to the ribs to form an additional lamination portion, the rib prepregs containing continuous fibers or slit continuous fibers as the reinforced fibers; and subjecting the substrate material portion and the additional lamination portion to press-forming with a molding die.

The above object, other objects, features, and advantages of the present disclosure will be made clear by the following detailed explanation of preferred embodiments with reference to the attached drawings.

DESCRIPTION OF EMBODIMENTS

Composite panel structure

A composite panel structure (hereinafter suitably abbreviated as "panel structure") according to an exemplary embodiment will be specifically described with reference to FIGS. 1A, 1B, and 2.

The panel structure is a press-formed product made of a composite material containing reinforced fibers and matrix resin. A specific configuration of the panel structure is not especially limited. For example, the panel structure is a panel structure 10A in which ribs intersect with each other in a cross shape as shown in FIG. 1A or a panel structure 10B having an isogrid as shown in FIG. 1B.

For ease of explanation, a plane where a substrate portion 11 is placed is referred to as an X-Y plane, and a direction in which the ribs stand is referred to as a z-axis.

Figure 1A:
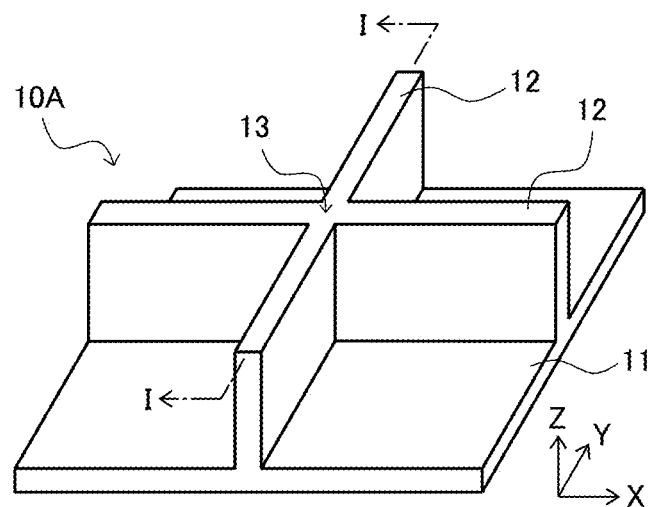
FIGS. 1A and 1B are schematic perspective views each showing the configuration of a composite panel structure according to an exemplary embodiment.
Figure 1B:
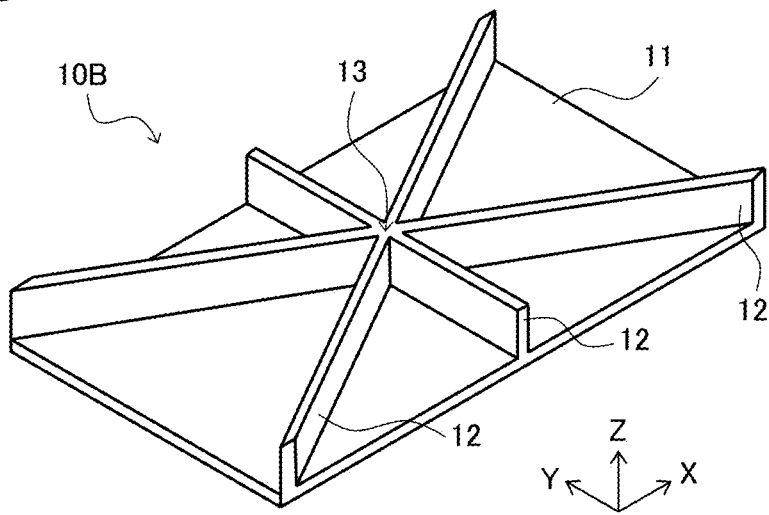

Each of the panel structure 10A shown in FIG. 1A and the panel structure 10B shown in FIG. 1B includes the substrate portion 11 and at least two ribs 12 standing on the substrate portion 11. A reference sign 13 indicates a rib intersecting portion 13 where the ribs 12 intersect with each other. Continuous fibers or slit continuous fibers are arranged at the ribs 12.

The slit continuous fibers are discontinuous fibers prepared by forming slits at continuous fibers oriented in one direction.

In the panel structure 10A shown in FIG. 1A, each of the ribs 12 extends in an x-axis direction or a y-axis direction and stands in a z-axis direction. To be specific, each rib 12 extends in a rib longitudinal direction. The two ribs 12 intersect with each other at right angles at the rib intersecting portion 13.

In the panel structure 10B shown in FIG. 1B, the three ribs 12 intersect with each other at equal angles at the rib intersecting portion 13. The intersecting angles of the ribs 12 are not limited to "right angles" or "equal angles."

Each of FIGS. 1A and 1B shows a basic unit of the panel structure, and each of the actual panel structure 10A and 10B is a combination of basic units.

Moreover, in FIGS. 1A and 1B, the substrate portion 11 has a flat plate shape. However, the substrate portion 11 may be curved depending on use, and the shape and thickness of the substrate portion 11 are not limited to these. Similarly, a specific shape, thickness, and height of the rib 12 is not especially limited. Since the ribs 12 are provided to reinforce the substrate portion 11, the thicknesses and heights of the ribs may be set in accordance with required strength of the substrate portion 11.

As one example, the ribs 12 and the rib intersecting portion 13 in the panel structure 10A shown in FIG. 1A will be described with reference to FIG. 2.

Each of the substrate portion 11 and the ribs 12 is made of at least matrix resin 21 and reinforced fibers 22. The substrate portion 11 is formed by, for example, laminating composite material layers on each other. The reinforced fibers 22 used in the substrate portion 11 are continuous fibers or slit continuous fibers as with the rib 12. The orientation direction of the reinforced fibers of the substrate 11 is a direction within the X-Y plane.

Or, the substrate portion 11 may contain short fibers as the reinforced fibers 22 instead of the continuous fibers. Moreover, as long as the reinforced fibers and the matrix resin are used in at least the ribs 12, the reinforced fibers do not necessarily have to be used in portions other than the ribs 12. For example, a known resin compound may be contained instead of the reinforced fibers.

Figure 2:
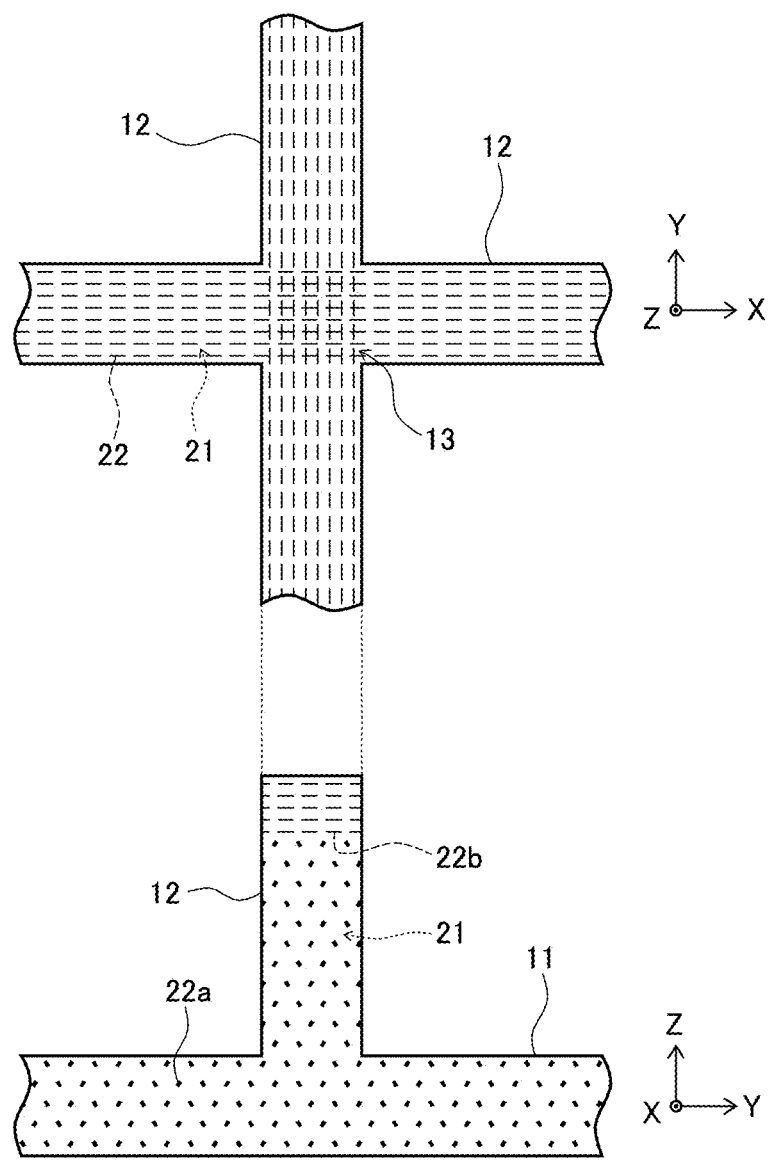
FIG. 2 is a diagram showing a comparison between schematic sectional views each showing internal structures of ribs and a rib intersecting portion in the composite panel structure shown in FIG. 1A or 1B.

FIG. 2 shows an example in which at least the continuous fibers or the slit continuous fibers are used as the reinforced fibers 22 in the substrate portion 11 and the ribs 12. In an upper side of FIG. 2, the reinforced fibers 22 are schematically shown by long broken lines, and white portions other than the reinforced fibers 22 correspond to the matrix resin 21. In a lower side of FIG. 2, since the reinforced fibers 22a are oriented in an arbitrary direction within the X-Y plane, for convenience sake, the reinforced fibers 22a are schematically shown by dots. Moreover, the reinforced fibers 22b are schematically shown by long broken lines as with the upper side of FIG. 2.

As shown in the upper side of FIG. 2, at each rib 12, the reinforced fibers 22 containing at least continuous fibers each having the orientation direction that is the longitudinal direction of the rib 12, i.e., the x-axis direction or the y-axis direction are arranged. Moreover, at the rib intersecting portion 13 where the ribs 12 intersect with each other at right angles, the reinforced fibers 22 are arranged so as to overlap each other.

In the lower side of FIG. 2, the reinforced fibers 22a in the substrate portion 11 are oriented in the arbitrary direction within the X-Y plane. Moreover, at the time of press-forming, the reinforced fibers 22a located in the substrate portion 11 and close to the rib 12 are pushed up to the rib 12. As a result, the reinforced fibers 22b of the rib 12 are formed at a tip end portion of the rib 12.

Therefore, the orientation directions of some of the reinforced fibers 22b at the tip end portion of the rib 12 substantially coincide with the longitudinal direction of the rib 12, and the reinforced fibers 22a derived from the substrate 11 and having the arbitrary orientation direction are arranged in the vicinity of a root of the rib 12.

When manufacturing the panel structures 10A and 10B made of the composite material, prepregs are typically used. Each of the prepregs is a sheet prepared in such a manner that a base material made of the reinforced fibers 22 is impregnated with the matrix resin 21. When thermosetting resin is used as the matrix resin 21 as described below, the matrix resin 21 in the prepreg may be in a semi-cured state.

Specific types of the matrix resin 21 and the reinforced fibers 22 are not especially limited, and known applicable materials may be suitably selected and used.

Typical examples of the matrix resin 21 include thermosetting resin and thermoplastic resin. A specific type of the thermosetting resin is not especially limited. Examples of the thermosetting resin include epoxy resin, polyester resin, vinylester resin, phenol resin, cyanate ester resin, polyimide resin, and polyamide resin. These thermosetting resins may be used alone or in combination of plural types. Further, a more specific chemical structure of the thermosetting resin is not especially limited, and the thermosetting resin may be a polymer formed by polymerizing known various monomers or may be a copolymer formed by polymerizing a plurality of monomers. Further, an average molecular weight, structures of a main chain and a side chain, and the like are not especially limited.

A specific type of the thermoplastic resin is not especially limited. However, engineering plastic, such as polyphenylene sulfide (PPS), polyether ether ketone (PEEK), and polyether imide (PEI), are preferably used. A more specific chemical structure of the thermoplastic resin is not especially limited, and the thermoplastic resin may be a polymer formed by polymerizing known various monomers or may be a copolymer formed by polymerizing monomers. Further, an average molecular weight, structures of a main chain and a side chain, and the like are not especially limited.

Components, such as a known additive, may be added to the matrix resin 21. Examples of the additive include known curing agents, curing accelerators, and reinforcing materials and fillers other than fiber base materials. A specific type, composition, and the like of the additive are not especially limited, and an additive of a known type or composition may be suitably used.

When the matrix resin 21 contains a component other than the resin, the matrix resin 21 can be regarded as a resin composition constituted by the resin and the component.

A specific type of the reinforced fibers 22 used in the composite material is not especially limited. Examples of the reinforced fibers 22 include carbon fibers, polyester fibers PBO (polyparaphenylene benzobisoxazole) fibers, boron fibers, aramid fibers, glass fibers, silica fibers (quartz fibers), silicon carbide (SiC) fibers, and nylon fibers. As the reinforced fibers 22, these fibers may be used alone or in suitable combination of two or more types. The base material of the reinforced fibers 22 is not especially limited. Typical examples of the base material of the reinforced fibers 22 include woven fabric, braid fabric, knit fabric, and nonwoven fabric.

Continuous fibers or long fibers (which are discontinuous fibers but are long) may be used as the reinforced fibers 22. Moreover, plural types of fibrous materials, fillers, or reinforcing materials may be used as the reinforced fibers 22. For example, in the substrate portion 11, the short fibers may be used together with the matrix resin 21 instead of the continuous fibers, and a particle-shaped filler or reinforcing material (filler) may be used instead of a fiber-shaped filler. As the filler or the reinforcing material, known fillers or known reinforcing materials may be suitably used in accordance with the type of the composite material or the type of the matrix resin 21.

When plural types of fibrous materials are used together, the short fibers may be used together with the continuous fibers. When the reinforced fibers 22 are constituted as the base material, such as woven fabric or braid fabric, of the continuous fibers, the base material may partially include slits. When the reinforced fibers 22 are the base material, the base material including the slits and a normal base material not including the slits may be used together. In this case, especially, in terms of strength, it is preferable that portions, corresponding to the rib intersecting portion 13, of the reinforced fibers 22 do not contain the slits.

Laminated Prepregs

Next, laminated prepregs used to manufacture the panel structure 10A and 10B will be described with reference to FIGS. 3A, 3B, 4A, and 4B.

In an exemplary embodiment, for example, each of the panel structure 10A and 10B each including the substrate portion 11, the ribs 12, and the rib intersecting portion 13 is manufactured in such a manner that the prepregs are laminated on each other in a predetermined shape to form the laminated prepregs; and the laminated prepregs is subjected to the press-forming.

Figure 3A:
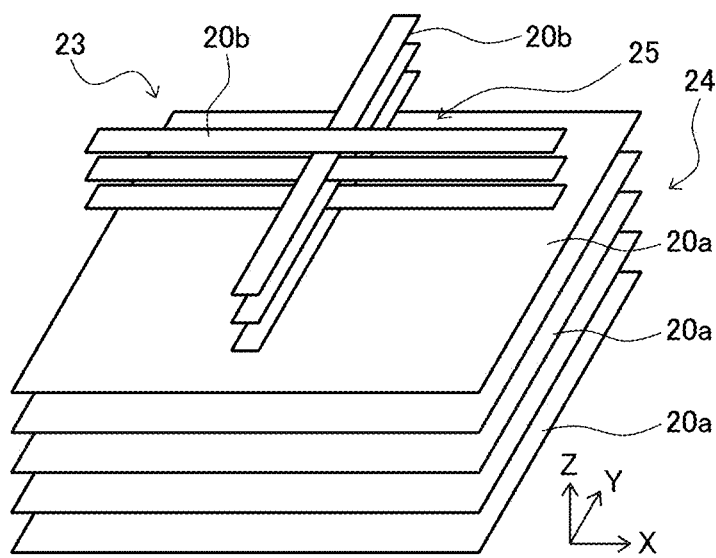
FIGS. 3A and 3B are exploded perspective views each showing one example of a laminated prepregs used to manufacture the composite panel structure shown in FIG. 1A.
Figure 3B:
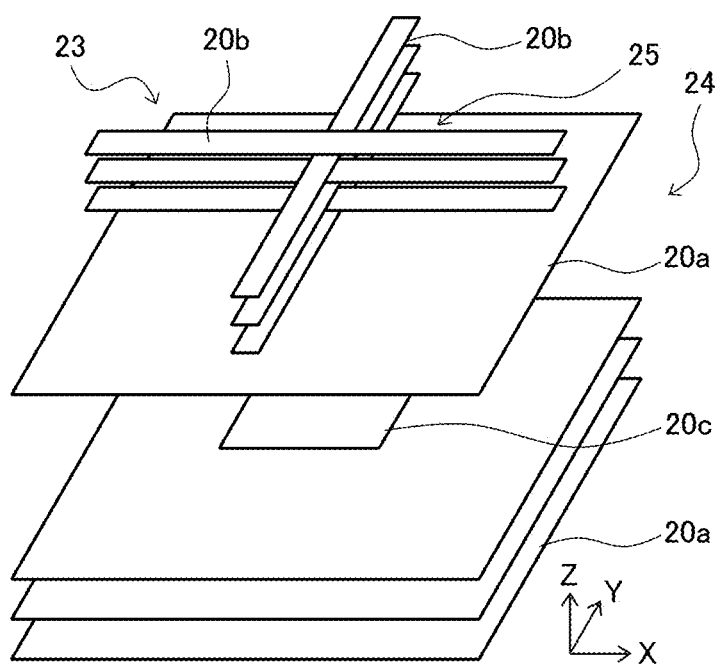

In the examples shown in FIGS. 3A, 3B, 4A, and 4B, when forming a laminated prepregs 23, at least substrate prepregs 20a which constitute the substrate portion 11 and rib prepregs 20b which constitute the ribs 12 are used. As shown in FIG. 3B, according to need, a doubler prepreg 20c which constitutes the ribs 12 and the rib intersecting portion 13 is used.

Specifically, the laminated prepregs 23 before the press-forming is constituted by at least a substrate material portion 24 and an additional lamination portion 25. In an exemplary embodiment, the substrate material portion 24 is a portion (substrate lamination portion) in which the substrate prepregs 20a constituting the substrate portion 11 are laminated on each other. When the reinforced fibers of the substrate prepreg 20a are continuous fibers or slit continuous fibers, the orientation direction of the reinforced fibers is the arbitrary direction within the X-Y plane. When the substrate prepregs 20a are not used, the substrate material portion 24 is not the laminated prepregs and may be, for example, a single plate-shaped portion.

Figure 4A:
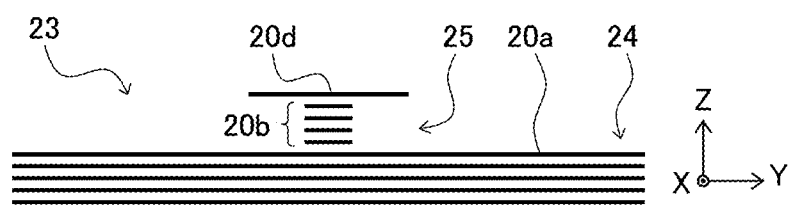
FIGS. 4A and 4B are schematic side views each showing another example of the laminated prepregs used to manufacture the composite panel structure shown in FIG. 3A.
Figure 4B:
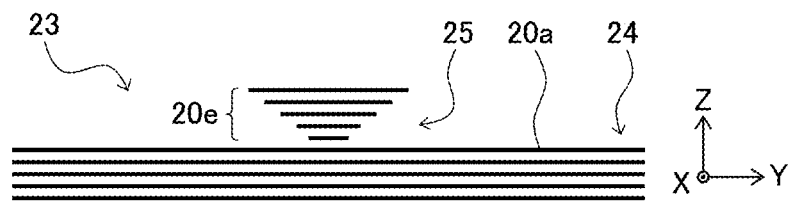

The additional lamination portion 25 is a portion where the rib prepregs 20b are additionally laminated on each other at a position of the substrate material portion 24 which position corresponds to the ribs 12 and the rib intersecting portion 13. Each of FIGS. 3A and 3B shows one example of the laminated prepregs 23 as an exploded perspective view, and each of FIGS. 4A and 4B shows another example of the laminated prepregs 23 as a schematic side view.

As shown in FIGS. 3A and 3B, the rib prepregs 20b are additionally laminated on each other so as to overlap each other at the position corresponding to the ribs 12 and the rib intersecting portion 13. With this, in the panel structure 10A, the reinforced fibers 22 derived from the rib prepregs 20b are arranged at a position corresponding to the rib intersecting portion 13. Moreover, in the laminated prepregs 23 shown in FIG. 3B, the doubler prepreg 20c smaller in area than the substrate prepreg 20a is additionally laminated at a position corresponding to the rib intersecting portion 13 and its peripheral portion (the ribs 12 adjacent to the rib intersecting portion 13) so as to be interposed between the substrate prepregs 20a.

The additional lamination portion 25 does not have a three-dimensional shape similar to the shape of the rib 12 but has such a shape that the thickness of the substrate material portion 24 is partially thick (at the position corresponding to the ribs 12 and the rib intersecting portion 13).

As described below, by subjecting the laminated prepregs 23 having a substantially flat plate shape to the press-forming, the rib prepregs 20b (or the rib prepregs 20b and the doubler prepreg 20c) are introduced to a cavity, corresponding to the ribs 12, of a molding die to form the ribs 12. In an exemplary embodiment, for example, by using slit prepregs (or prepregs containing slit continuous fibers) as the substrate prepregs 20a (and the doubler prepreg 20c), the substrate prepregs 20a constituting the substrate material portion 24 can also be introduced to the ribs 12.

However, since an introduction amount of substrate prepregs 20a is limited, the rib intersecting portion 13 and the ribs 12 around the rib intersecting portion 13 (i.e., the rib 12 adjacent to the rib intersecting portion 13) cannot be constituted only by the substrate prepregs 20a. Therefore, as in the laminated prepregs 23 shown in FIGS. 3A, 4A, and 4B, the volume of the rib intersecting portion 13 and the volumes of the ribs 12 around the rib intersecting portion 13 are supplemented by the rib prepregs 20b. Moreover, as shown in FIG. 3B, by using the doubler prepreg 20c in addition to the rib prepregs 20b, the volume of the rib intersecting portion 13 and the volumes of the ribs 12 around the rib intersecting portion 13 may be supplemented.

In the laminated prepregs 23 shown in FIGS. 3A, 4A, and 4B, a prepreg having a strip shape having a substantially constant width in a longitudinal direction is used as the rib prepreg 20b. However, a specific shape of the rib prepreg 20b is not limited to this. The width of the rib prepreg 20b in the longitudinal direction may change partially or gradually.

In the laminated prepregs 23 shown in FIG. 3A, the rib prepregs 20b that are substantially the same in shape (strip shape) as each other are laminated on each other. However, in the laminated prepregs 23 shown in FIGS. 4A and 4B, prepregs that are different in width from each other are used as the rib prepregs 20b. For example, in the additional lamination portion 25 of the laminated prepregs 23 shown in FIG. 4A, the rib prepregs 20b that are substantially the same in shape as each other are laminated on each other, and a rib outer surface prepreg 20d that is larger in width than the rib prepreg 20b is laminated at an outermost surface side. Or, used in the additional lamination portion 25 of the laminated prepregs 23 shown in FIG. 4B are width-changing rib prepregs 20e which gradually increase in width as the width-changing rib prepregs 20e are located at the outer surface side (upper side in an exemplary embodiment; opposite side of the substrate material portion 24).

In the panel structure 10A obtained by the configuration shown in FIG. 4A or 4B, the outer surface side of the rib 12 can be covered with the wider composite material layer. Therefore, the possibility of peel-off of the composite material layers constituting the rib 12 can be further suppressed. The width of the rib outer surface prepreg 20d is not especially limited, and the width of the widest one of the width-changing rib prepregs 20e is not especially limited. Typically, each of the width of the rib outer surface prepreg 20d and the width of the widest one of the width-changing rib prepregs 20e may be larger than at least the width (thickness) of the rib 12.

For example, the shapes of the prepregs 20a to 20c, the number of prepregs 20a to 20c laminated, laminating directions of the prepregs 20a to 20c, and the like may be suitably set in accordance with the shape, use, type, and the like of the panel structure 10A to be manufactured. In the example shown in FIG. 3A, a prepreg having a thin and long band shape corresponding to the shape of the rib 12 is used as the rib prepreg 20b. However, a prepreg that spreads as with the doubler prepreg 20c may be used as the rib prepreg 20b. In FIGS. 3A, 3B, 4A, and 4B, the number of substrate prepregs 20a laminated is four to five, the number of rib prepregs 20b laminated is three to five, and the number of doubler prepregs 20c laminated is one. However, each of these numbers of prepregs shown in the drawings is merely and schematically shown by a one digit number for convenience of explanation. Actually, a large number of prepregs may be laminated on each other in accordance with the structure of the panel structure 10A.

The laminated prepregs 23 may include a metal mesh layer or metal foil as another material layer. Since the metal mesh layer and the metal foil have stretchability, each of the metal mesh layer and the metal foil can be suitably used as the above-described another material layer of the panel structure 10A according to the present disclosure. For example, a copper mesh layer may be laminated on the surface of the laminated prepregs 23. The panel structure 10A including the surface on which the copper mesh is formed can be manufactured by subjecting the laminating prepregs 23 including the copper mesh layer to heating-pressurizing forming. For example, a composite-material part including the copper mesh layer is preferably used for a thunder resistance protection measure.

Moreover, as yet another material layer, the laminated prepregs 23 may include a material layer made of a non-conductive composite material (glass fiber reinforced plastic (GFRP), for example). The non-conductive composite material may be laminated on the entire surface of the laminated prepregs 23 or may be partially laminated on the surface of the laminated prepregs 23. The panel structure 10A including the surface on which the layer made of the non-conductive composite material is formed can be manufactured by subjecting the laminated prepregs including the layer made of the non-conductive composite material to the heating-pressurizing forming as described below.

The non-conductive composite material on the surface is typically used for an electrocorrosion measure (for example, a measure for, when CFRP and a metal member that is far from the CFRP in terms of ionization tendency are brought into contact with each other, suppressing corrosion of the metal member). A specific type of the non-conductive composite material is not especially limited, and a known material may be suitably used. Moreover, the use of the non-conductive composite material is not limited to the electrocorrosion measure and may be used for other known use.

Method of Manufacturing Panel Structure

Next, a method of manufacturing the panel structure will be specifically described with reference to FIGS. 5A and 5B.

First, each of the panel structure 10A and 10B is formed in such a manner that the laminated prepregs 23 is formed by the prepregs 20a and 20b, the prepregs 20a to 20c, the prepregs 20a, 20b, and 20d, the prepregs 20a and 20e, or the like and is then subjected to the press-forming. In an exemplary embodiment, the laminated prepregs 23 of FIG. 4) to which the doubler prepreg 20c of FIG. 3B is added will be described for convenience sake in the explanation of forming the ribs 12 and the rib intersecting portion 13 by the press-forming in the manufacturing method according to the present disclosure.

Figure 5A:
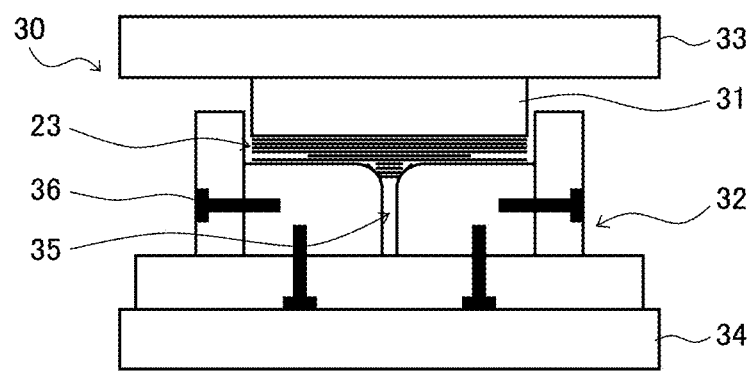
FIG. 5A is a schematic diagram showing a typical example of a press-forming die used to manufacture the composite panel structure shown in FIG. 1A.

As shown in FIG. 5A, a molding die 30 used at the time of the press-forming is a die used to manufacture the panel structure 10A having a cross structure shown in FIG. 1A and includes an upper die 31, a lower die 32, an upper hot plate 33, a lower hot plate 34, and the like.

In the example shown in FIG. 5A, the upper die 31 corresponds to a lower surface of the substrate portion 11 (lower surface in FIG. 1A), and the lower die 32 corresponds to an upper surface of the substrate portion 11 (upper surface in FIG. 1A) and the ribs 12. A cavity 35 is formed between the upper die 31 and the lower die 32.

Figure 5B:
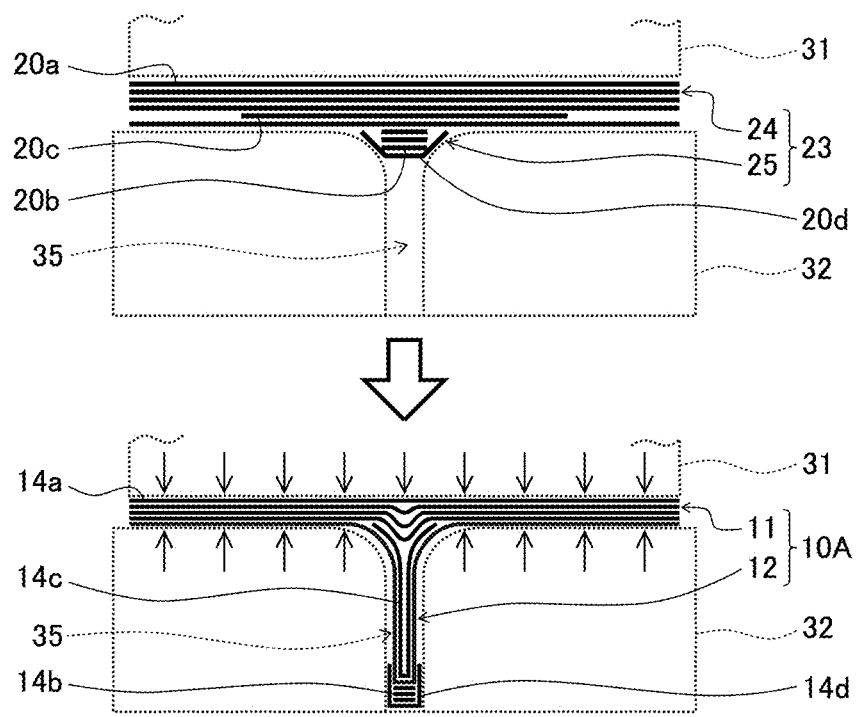
FIG. 5B is a partially enlarged schematic diagram showing the laminated prepregs and a cavity of the press-forming die shown in the schematic diagram of FIG. 5A.

As shown in an upper side of FIG. 5B, the laminated prepregs 23 is constituted by the substrate prepregs 20a, the rib prepregs 20b, the doubler prepreg 20c, and the rib outer surface prepreg 20d. In an exemplary embodiment, slit prepregs are used as the doubler prepreg 20c and at least some substrate prepregs 20a located at the upper side among the substrate prepregs 20a. As each of the rib prepregs 20b and the rib outer surface prepreg 20d, a normal prepreg constituted by continuous fibers having no slits may be used, or a slit prepreg may be used.

Moreover, in the laminated prepregs 23, the substrate material portion 24 may be constituted as the substrate lamination portion as shown in FIGS. 5A and 5B, or may be the above-described single-layer structure, not the substrate lamination portion. Or, the laminated prepregs 23 may not include the doubler prepreg 20c as shown in FIG. 4A, or the width-changing rib prepregs 20e may be used instead of the rib prepregs 20b as shown in FIG. 4B.

The upper hot plate 33 is provided at an outer side (upper side) of the upper die 31, and the lower hot plate 34 is provided at an outer side (lower side) of the lower die 32. The hot plates 33 and 34 apply heat and pressure to the upper die 31 and the lower die 32. With this, the laminated prepregs 23 interposed between the upper die 31 and the lower die 32 is subjected to heating and pressurizing (hot pressing), and thus, the panel structure 10A is formed. The lower die 32 includes a complex depression-projection structure corresponding to the ribs 12 and the rib intersecting portion 13. Therefore, in the example shown in FIG. 5A, the lower die 32 is constituted by fastening and fixing die members with fasteners 36. The configuration of the molding die 30 is not limited to the configuration shown in FIG. 5A.

As shown in the upper side of FIG. 5B, first, the laminated prepregs 23 is arranged between the upper die 31 and the lower die 32. Next, as shown in a lower side of FIG. 5B, the upper die 31 and the lower die 32 are subjected to heating and pressurizing (hot pressing) by the upper and lower hot plates 33 and 34. In the lower side of FIG. 5B, arrows schematically indicate a pressurizing direction. With this, the matrix resin 21 constituting the prepregs 20a to 20d flows, and the reinforced fibers 22 flow or stretch (or flow and stretch) together with the matrix resin 21.

As a result, the rib prepregs 20b are introduced into a space of the cavity 35 which space corresponds to the ribs 12 and the rib intersecting portion 13. Moreover, in an exemplary embodiment, since the slit prepregs are used as the substrate prepregs 20a, some substrate prepregs 20a located at the ribs 12 side ("upper" side of the laminated prepregs 23 in an exemplary embodiment; lower side in FIG. 5B) among the substrate prepreg 20a are introduced into the space corresponding to the rib intersecting portion 13 and the ribs 12 around the rib intersecting portion 13. Moreover, the doubler prepreg 20c which is laminated at a position corresponding to the ribs 12 and is the slit prepreg is also introduced to the rib intersecting portion 13 and the ribs 12 around the rib intersecting portion 13.

With this, as shown in the lower side of FIG. 5B, composite material layers 14b derived from the rib prepregs 20b are formed at a tip end side of each rib 12. At this time, since the rib outer surface prepreg 20d is laminated at a most tip end side of the rib 12, a tip-end outer surface of the rib 12 is covered with a composite material layer 14d derived from the rib outer surface prepreg 20d. Moreover, in an exemplary embodiment, since the doubler prepreg 20c is used, a composite material layer 14c derived from the doubler prepreg 20c and composite material layers 14a derived from the substrate prepregs 20a are formed at most portions of the ribs 12 including root portions of the ribs 12.

As above, the ribs 12 include the composite material layers 14b derived from the rib prepregs 20b. Since the continuous fibers or the slit continuous fibers are used as the reinforced fibers 22 of the rib prepregs 20b, not only the strengths of the ribs 12 but also the strength of the rib intersecting portion 13 can be further improved.

Figure 6A:
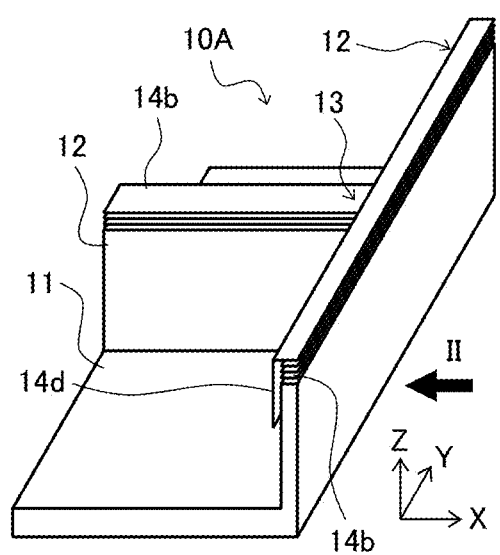
FIGS. 6A and 6B are schematic perspective views which are taken along line I-I of FIG. 1A and are used to explain composite material layers forming the ribs and the rib intersecting portion in the composite panel structure shown in FIG. 1A.
Figure 6B:
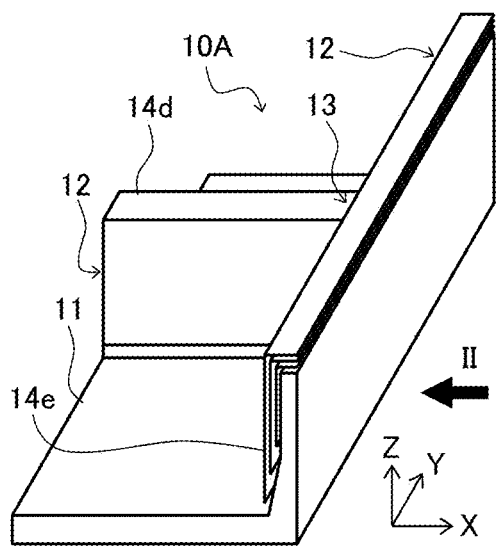
Figure 6C:
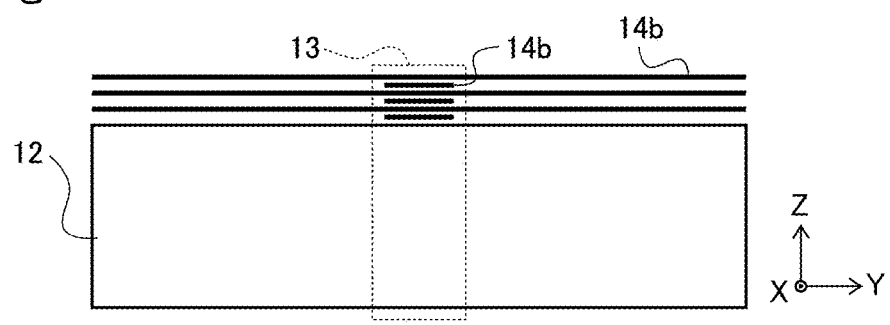
FIG. 6C is a schematic plan view showing that a section of the rib shown in FIG. 6A or 6B is viewed from a direction indicated by a block arrow II.

The arrangement of the continuous fibers at the rib intersecting portion 13 will be more specifically described with reference to FIGS. 6A to 6C. Each of FIGS. 6A and 6B is a diagram taken along line I-I (one-dot chain line) in the panel structure 10A shown in FIG. 1A and schematically shows a section (vertical section) of the rib 12 having the longitudinal direction that is the y-axis direction out of the two ribs 12 having the cross structure. FIG. 6C is a schematic diagram when the section of FIG. 6A is viewed from the x-axis direction.

FIG. 6A is an exploded perspective view showing the composite material layers 14b located a tip end side (outer surface side) of the rib 12 and the composite material layer 14d located at an outermost side (most tip end side) of the rib 12. Moreover, FIG. 6B is an exploded perspective view showing composite material layers 14e located at the tip end side of the rib 12.

FIG. 6A corresponds to a configuration in which: the rib prepregs 20b that are substantially the same in shape as each other are laminated on each other; and the rib outer surface prepreg 20d is laminated at the most tip end side. Therefore, the composite material layers 14b shown in FIG. 6A are layers derived from the rib prepregs 20b that are substantially the same in shape as each other as shown in FIG. 4A, and the composite material layer 14d is a layer derived from the rib outer surface prepreg 20d shown in FIG. 4A. The composite material layers 14b are layers simply laminated on the tip end portion of the rib 12, and the composite material layer 14d covers at least part of the outer surface side of the rib 12 or the entire outer surface side of the rib 12 as described above.

FIG. 6B corresponds to a configuration in which the width-changing rib prepregs 20e of FIG. 4B are laminated on each other. Therefore, the composite material layers 14e shown in FIG. 6B are layers derived from the width-changing rib prepregs 20e shown in FIG. 4B. Since the width-changing rib prepregs 20e gradually increase in width as the width-changing rib prepregs 20e are located at the tip end side of the rib 12 (z-axis direction), the composite material layers 14e are layers which increase in area as the layers are located at the tip end side, the area being an area where the layer covers the tip end portion of the rib 12.

Moreover, as shown in FIG. 6C, in the rib intersecting portion 13 of one of the ribs 12 having the cross structure, the composite material layers 14b (or the composite material layer 14d or the composite material layers 14e) constituting the one rib 12 and the composite material layers 14b (or the composite material layer 14d or the composite material layers 14e) constituting the other rib 12 are laminated on each other.

With this, in the panel structure 10A made of the composite material by the press-forming, the continuous fibers or the slit continuous fibers are arranged at not only the ribs 12 but also the rib intersecting portion 13. Therefore, the substrate portion 11 can be reinforced by not only the ribs 12 but also the rib intersecting portion 13. In addition, the composite material layers 14b (or the composite material layer 14d or the composite material layers 14e) are laminated on each other in an extending direction of the rib 12. Therefore, the continuous fibers or the slit continuous fibers are also arranged at the rib intersecting portion 13 along the extending direction of the rib 12 and are arranged at the rib intersecting portion 13 such that the continuous fibers or the slit continuous fibers also intersect with each other by the intersecting of the ribs 12. Thus, the effect of reinforcing the substrate portion 11 by the rib intersecting portion 13 can be further improved.

For example, when the three-dimensional structure, such as the cross structure, is included, the prepregs are laminated so as to form a three-dimensional shape corresponding to such complex shape. Therefore, a time required for the laminating typically becomes long. Moreover, since it is normally difficult to subject the complex three-dimensional shape laminated as above to the press-forming, autoclave molding is practically used. However, a molding time of the autoclave molding is long. Manufacturing the panel structure having the three-dimensional structure by using prior art as above requires a large amount of time, and therefore, mass production is difficult.

On the other hand, in an exemplary embodiment, since the laminated prepregs 23 has a substantially flat plate shape, the laminated prepregs 23 can be subjected to the press-forming, and therefore, the panel structure having the complex three-dimensional shape including the ribs 12 can be easily manufactured.

Moreover, it is conventionally difficult to arrange the continuous fibers at a three-dimensional structure part, such as a rib, by the press-forming. However, by subjecting the laminated prepregs 23 including the additional lamination portion 25 to the press-forming, the panel structure including the rib intersecting portion 13 at which the continuous fibers or the slit continuous fibers are arranged and having improved strength and rigidity can be manufactured.

Figure 7A:
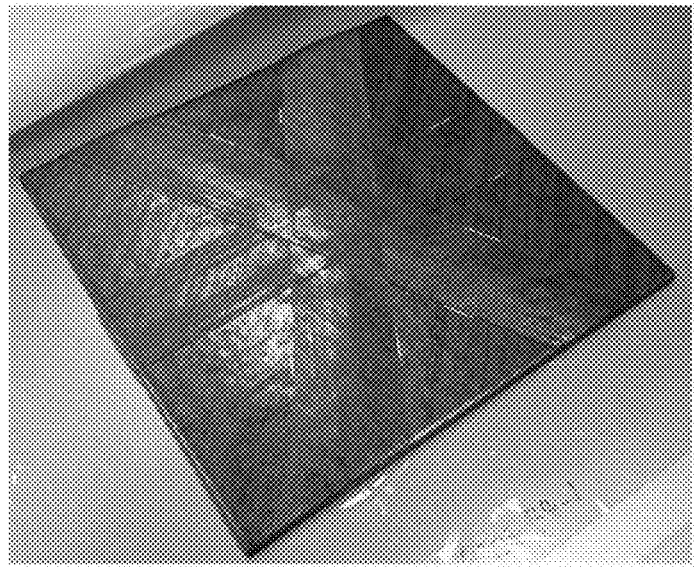
FIG. 7A is a diagram showing one example of a photograph of a laminated prepregs used to manufacture the composite panel structure.
Figure 7B:
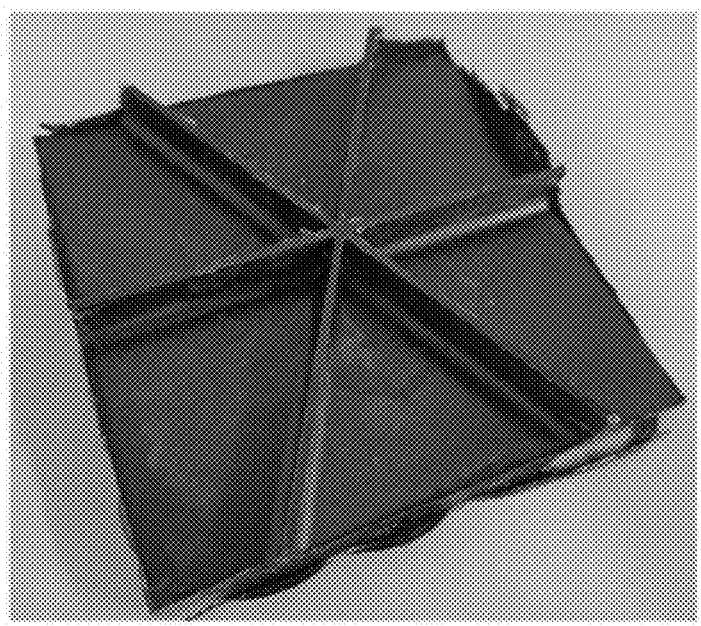
FIG. 7B is a diagram showing one example of a photograph of the composite panel structure obtained by subjecting the laminated prepregs of FIG. 7A to press-forming.

The following will be described with reference to FIGS. 7A and 7B. Each of FIGS. 7A and 7B shows one example of the actually manufactured panel structure 10B having the isogrid shown in FIG. 1B. FIG. 7A shows one example of the laminated prepregs 23 in which the prepregs are laminated on each other. FIG. 7B shows one example of the panel structure 10B manufactured by subjecting the laminated prepregs 23 of FIG. 7A to the hot pressing.

As shown in FIG. 7A, the additional lamination portion 25 is visible on the upper surface of the substrate material portion 24, but the laminated prepregs 23 itself has a substantially flat plate shape. The panel structure 10B shown in FIG. 7B is manufactured by subjecting the laminated prepregs 23 to the hot pressing. As is clear from FIG. 7B, in the panel structure 10B, the ribs 12 standing on the substrate portion 11 can be formed, and the ribs 12 can intersect with each other to form the rib intersecting portion 13.

As above, the composite panel structure according to the present disclosure is a panel structure that is a press-formed product made of a composite material containing reinforced fibers and matrix resin. The composite panel structure according to the present disclosure includes a substrate portion, plate-shaped ribs standing on the substrate portion, and a rib intersecting portion where the ribs intersect with each other. In the ribs and the rib intersecting portion, continuous fibers or slit continuous fibers are arranged as the reinforced fibers.

Moreover, a method of manufacturing a composite panel structure according to the present disclosure is a method of manufacturing a panel structure made of a composite material containing reinforced fibers and matrix resin by press-forming. The panel structure includes a substrate portion, plate-shaped ribs standing on the substrate portion, and a rib intersecting portion where the ribs intersect with each other. A substrate material portion constituting the substrate portion is formed by using at least the matrix resin. Part of the ribs and part of the rib intersecting portion are formed at a position of the substrate material portion which position corresponds to the ribs and the rib intersecting portion. Rib prepregs in which continuous fibers or slit continuous fibers are used as the reinforced fibers are additionally laminated to form an additional lamination portion. The obtained laminated prepregs is subjected to press-forming with a molding die.

According to this configuration, in the panel structure made of the composite material by the press-forming, the continuous fibers are arranged at not only the ribs but also the rib intersecting portion. With this, the substrate portion can be reinforced by not only the ribs but also the rib intersecting portion. Therefore, in the composite panel structure, the strength of the intersecting portion of the ribs provided on the substrate portion can be further improved.

A specific use of the panel structure 10A and 10B according to the present disclosure is not especially limited. The panel structure 10A and 10B according to the present disclosure can be suitably used as panel-shaped members used in various fields, such as an aerospace field, an automobile/two-wheeled vehicle field, a railcar field, a marine field, an industrial equipment field, a medical equipment field, a sports goods field, and an architecture/civil engineering field. More preferably, the panel structure 10A and 10B according to the present disclosure are used in an aerospace field of aircrafts, spacecrafts, and the like.

The present invention is not limited to the above-described embodiment and may be modified in various ways within the scope of the claims, and embodiments obtained by suitably combining technical means disclosed in different embodiments and/or plural modified examples are included in the technical scope of the present invention.

From the foregoing explanation, many modifications and other embodiments of the present invention are obvious to one skilled in the art. Therefore, the foregoing explanation should be interpreted only as an example and is provided for the purpose of teaching the best mode for carrying out the present invention to one skilled in the art. The structures and/or functional details may be substantially modified within the scope of the present invention.

INDUSTRIAL APPLICABILITY

The present invention can be widely and suitably used in a field of a composite panel structure including ribs standing on a substrate portion and a rib intersecting portion.

The invention claimed is:

1. A method of manufacturing a composite panel structure, the method comprising:
    forming a substrate material portion of the composite panel structure by using at least a matrix resin, the substrate material portion comprising a substrate portion;
    laminating rib prepregs on the substrate material portion at a position corresponding to at least two ribs standing on the substrate portion and intersecting each other, wherein the rib prepregs are laminated to a height lower than a preset rib height, the rib prepregs are laminated along directions of the at least two ribs to form an additional lamination portion of the composite panel structure, the rib prepregs contain slit continuous fibers as reinforced fibers, and the slit continuous fibers are prepared by forming slits at continuous fibers oriented in one direction; and
    subjecting the substrate material portion and the additional lamination portion to press-forming with a molding die.

2. The method according to claim 1, wherein a rib prepreg located at an outermost surface side of the composite panel structure when forming the additional lamination portion is larger in width than the other rib prepregs.

3. The method according to claim 1, wherein:
    the substrate material portion is formed by laminating substrate prepregs on each other; and
    the substrate prepregs contain continuous fibers or slit continuous fibers as the reinforced fibers.

4. The method according to claim 1, wherein:
    a slit prepreg containing slit continuous fibers as the reinforced fibers is used at a side, where at least the ribs and a rib intersecting portion are located, of the substrate material portion, the rib intersecting portion being a portion where the ribs intersect with each other: and
    by the press-forming, at least some of the reinforced fibers derived from the substrate material portion are introduced to the ribs and the rib intersecting portion, and the rib prepregs are formed at tip end sides of the ribs.

5. The method according to claim 3, wherein:
    a slit prepreg containing slit continuous fibers as the reinforced fibers is used at a side, where at least the ribs and a rib intersecting portion are located, of the substrate material portion, the rib intersecting portion being a portion where the ribs intersect with each other; and a doubler prepreg having a smaller area than the substrate prepreg and containing slit continuous fibers as the reinforced fibers is additionally laminated so as to be interposed between the substrate prepregs at a position of the substrate material portion, the position corresponding to the rib intersecting portion and the ribs located adjacent to the rib intersecting portion.

6. The method according to claim 5, wherein by the press-forming, at least some of the reinforced fibers derived from the doubler prepreg are introduced to the rib intersecting portion.

7. The method according to claim 1, wherein:
a rib outer surface prepreg is laminated upon a lower die;
the rib prepregs are laminated on the rib outer surface prepreg;
a doubler prepreg is laminated over the rib prepregs; and
substrate prepregs are laminated on the double prepreg.

8. The method according to claim 7, wherein:
the substrate prepreg is wider than the doubler prepreg; and
the doubler prepreg is wider than the rib prepregs.

9. The method according to claim 8, wherein:
an area of the substrate prepreg is larger than an area of the doubler prepreg; and
the area of the doubler prepreg is larger than an area of the rib prepregs.

* * * * *